US012800418B2

(12) United States Patent
Zhang et al.

(10) Patent No.: US 12,800,418 B2
(45) Date of Patent: Nov. 17, 2026

(54) BAROMETRIC PRESSURE SENSOR AND METHOD FOR PREPARING SAME, AND ELECTRONIC DEVICE

(71) Applicants: Beijing BOE Sensor Technology Co., Ltd., Beijing (CN); BOE Technology Group Co., Ltd., Beijing (CN)

(72) Inventors: Taonan Zhang, Beijing (CN); Yue Li, Beijing (CN); Qiuxu Wei, Beijing (CN); Weilong Guo, Beijing (CN); Lihui Wang, Beijing (CN); Jie Sun, Beijing (CN); Nana He, Beijing (CN); Wenbo Chang, Beijing (CN); Feng Qu, Beijing (CN)

(73) Assignees: BEIJING BOE SENSOR TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 272 days.

(21) Appl. No.: 18/639,177

(22) Filed: Apr. 18, 2024

(65) Prior Publication Data

US 2024/0319031 A1 Sep. 26, 2024

Related U.S. Application Data

(63) Continuation of application No. PCT/CN2023/082986, filed on Mar. 22, 2023.

(51) Int. Cl.
*G01L 19/00* (2006.01)
*G01N 27/22* (2006.01)

(52) U.S. Cl.
CPC ........ *G01L 19/0092* (2013.01); *G01N 27/223* (2013.01)

(58) Field of Classification Search
CPC ... G01L 8/0072; G01L 8/0073; G01L 8/0075; G01L 19/0092; G01N 27/223
See application file for complete search history.

(56) References Cited

U.S. PATENT DOCUMENTS 9,027,400 B2 * 5/2015 Le Neel ............... G01N 27/223 73/335.04
9,176,089 B2 * 11/2015 Le Neel ................... G01K 7/01
(Continued)

FOREIGN PATENT DOCUMENTS

CN 1845327 A 10/2006
CN 104634833 A 5/2015
(Continued)

*Primary Examiner* — Justin N Olamit
(74) *Attorney, Agent, or Firm* — WHDA, LLP

(57) ABSTRACT

Disclosed are a barometric pressure sensor and a method for preparing the same, and an electronic device, which relate to the technical field of sensors. The barometric pressure sensor includes a base substrate, and a first capacitor provided on a side of the base substrate. The first capacitor includes a first bottom electrode provided close to the base substrate; a first insulating layer provided on a side of the first bottom electrode away from the base substrate; and a first top electrode provided on a side of the first insulating layer away from the base substrate. The first top electrode is provided with a first opening which is configured to expose the first insulating layer at a corresponding position. A dielectric constant of the first insulating layer may vary with different humidity environments, so that a capacitance value of the first capacitor varies.

18 Claims, 5 Drawing Sheets

(56) References Cited

U.S. PATENT DOCUMENTS

| | | | | |
|---|---|---|---|---|
| 10,101,292 | B2 * | 10/2018 | Chen .................... | G01N 27/223 |
| 10,107,773 | B2 * | 10/2018 | El-Gamal ............ | G01N 27/223 |
| 12,031,933 | B2 * | 7/2024 | Akimoto .............. | G01N 27/221 |
| 2016/0266061 | A1 | 9/2016 | Yu et al. | |
| 2018/0113041 | A1 | 4/2018 | Zheng | |

FOREIGN PATENT DOCUMENTS

| | | | |
|---|---|---|---|
| CN | 105067178 | A | 11/2015 |
| CN | 105181186 | A | 12/2015 |
| CN | 205280640 | U | 6/2016 |
| CN | 113340950 | A | 9/2021 |
| CN | 115235655 | A | 10/2022 |
| EP | 3239681 | A1 | 11/2017 |

* cited by examiner

BAROMETRIC PRESSURE SENSOR AND METHOD FOR PREPARING SAME, AND ELECTRONIC DEVICE

FIELD

The present disclosure relates to the technical field of sensors, and in particular to a barometric pressure sensor and a method for preparing the same, and an electronic device.

BACKGROUND

The era of the Internet of Things (IoT) is a product of human perception and transformation of the surrounding environment. A variety of sensors are placed in things to collect their physical, chemical, biological, and location information in real time, and connect things to things, and things to people through the network, so as to realize intelligent identification and management of things and processes. The development of IoT can monitor the environment in many aspects, including industrial environment, home environment, natural environment, etc. There is a huge market.

SUMMARY

The present disclosure provides a barometric pressure sensor including a base substrate, and a first capacitor provided on a side of the base substrate, where the first capacitor includes:

a first bottom electrode, provided close to the base substrate;

a first insulating layer, provided on a side of the first bottom electrode away from the base substrate; and a first top electrode, provided on a side of the first insulating layer away from the base substrate, where the first top electrode is provided with a first opening, and the first opening is configured to expose the first insulating layer at a corresponding position; and a dielectric constant of the first insulating layer may vary with different humidity environments, so that a capacitance value of the first capacitor varies.

In some embodiments, a surface of the first insulating layer away from the base substrate and a surface of the first top electrode close to the base substrate are in contact with each other.

In some embodiments, the first capacitor further comprises:

a first cavity provided between the first insulating layer and the first top electrode, an orthographic projection of the first cavity on the base substrate at least partially overlaps with an orthographic projection of the first opening on the base substrate, and an area of the orthographic projection of the first cavity on the base substrate is greater than an area of the orthographic projection of the first opening on the base substrate.

In some embodiments, the barometric pressure sensor further comprises:

a heating electrode insulated from the first bottom electrode and the first top electrode, respectively, an orthographic projection of the heating electrode on the base substrate does not overlap with an orthographic projection of the first bottom electrode on the base substrate and an orthographic projection of the first top electrode on the base substrate, and the orthographic projection of the heating electrode on the base substrate is within the orthographic projection of the first insulating layer on the base substrate.

In some embodiments, the heating electrode is provided on the same layer and made of the same material as the first bottom electrode, and the heating electrode is a closed structure surrounding the first bottom electrode; and/or the heating electrode is provided on the same layer and made of the same material as the first top electrode, and the heating electrode is a closed structure surrounding the first top electrode.

In some embodiments, in a first direction parallel to the base substrate, the barometric pressure sensor comprises a plurality of heating electrodes separated from each other, and the first direction is a direction from a center to an edge of the first insulating layer.

In some embodiments, the first opening has at least one of the following features:

on a plane parallel to the base substrate, a plurality of first openings are evenly arranged on the first top electrode;

on the plane parallel to the base substrate, the plurality of first openings are arranged in an array along a row direction and/or a column direction;

a ratio of an area of an orthographic projection of the first opening on the base substrate to an area of an orthographic projection of the first top electrode on the base substrate is greater than or equal to 5% and less than or equal to 10%; and a shape of the orthographic projection of the first opening on the base substrate comprises at least one of a sector, an ellipse, a polygon and an irregular shape.

In some embodiments, an orthographic projection of the first insulating layer on the base substrate covers an orthographic projection of the first bottom electrode on the base substrate and an orthographic projection of the first top electrode on the base substrate, respectively, and the orthographic projection of the first bottom electrode on the base substrate at least partially overlaps with the orthographic projection of the first top electrode on the base substrate.

In some embodiments, the barometric pressure sensor further comprises a second capacitor provided on the same side of the base substrate as the first capacitor, and the second capacitor comprises:

a second bottom electrode, provided close to the base substrate;

a second cavity, provided on a side of the second bottom electrode away from the base substrate; and a second top electrode, provided on a side of the second cavity away from the base substrate;

wherein the second cavity is a sealed cavity, and the second top electrode may deform under an action of external barometric pressure, so that a capacitance value of the second capacitor varies. In some embodiments, the barometric pressure sensor further comprises:

a third cavity, provided on a side of the second top electrode away from the base substrate; and a third top electrode, provided on a side of the third cavity away from the base substrate;

wherein the second top electrode, the third cavity and the third top electrode constitute a third capacitor, and the third top electrode is provided with a second opening which is configured to communicate an external environment with the third cavity.

In some embodiments, the second opening has at least one of the following features:

on a plane parallel to the base substrate, a plurality of second openings are evenly arranged on the third top electrode;

on the plane parallel to the base substrate, the plurality of second openings are arranged in an array along a row direction and/or a column direction;

a ratio of an area of an orthographic projection of the second opening on the base substrate to an area of an orthographic projection of the third top electrode on the base substrate is greater than or equal to 5% and less than or equal to 10%; and a shape of the orthographic projection of the second opening on the base substrate comprises at least one of a sector, an ellipse, a polygon and an irregular shape.

In some embodiments, the first bottom electrode is provided on the same layer as the second top electrode.

In some embodiments, the second capacitor is provided between the first capacitor and the base substrate, and an orthographic projection of the first capacitor on the base substrate at least partially overlaps with an orthographic projection of the second capacitor on the base substrate.

In some embodiments, the second top electrode and the first bottom electrode share the same electrode or are provided independently of each other.

In some embodiments, an orthographic projection of the first capacitor on the base substrate does not overlap with an orthographic projection of the second capacitor on the base substrate.

In some embodiments, an orthographic projection of the second bottom electrode on the base substrate and an orthographic projection of the second top electrode on the base substrate both cover an orthographic projection of the second cavity on the base substrate, and the orthographic projection of the second bottom electrode on the base substrate at least partially overlaps with the orthographic projection of the second top electrode on the base substrate.

In some embodiments, an orthographic projection of the second top electrode on the base substrate covers an orthographic projection of the third cavity on the base substrate, the orthographic projection of the third cavity on the base substrate is within an outer contour of an orthographic projection of the third top electrode on the base substrate, and the orthographic projection of the second top electrode on the base substrate at least partially overlaps with the orthographic projection of the third top electrode on the base substrate.

In some embodiments, the barometric pressure sensor further comprises at least one of:

a second insulating layer, provided between the first bottom electrode and the first insulating layer, wherein an orthographic projection of the second insulating layer on the base substrate at least covers an orthographic projection of the first bottom electrode on the base substrate; and a third insulating layer, provided on a side of the first top electrode away from the base substrate, wherein the third insulating layer is provided with a third opening, and an orthographic projection of the third opening on the base substrate at least partially overlaps with an orthographic projection of the first opening on the base substrate.

In some embodiments, a material of the first insulating layer comprises at least one of polyimide, positive photoresist, negative photoresist and polydimethylsiloxane.

The present disclosure provides an electronic device comprising:

the barometric pressure sensor according to any one of embodiments; and a detection circuit, connected to the barometric pressure sensor, for determining an environment humidity around the barometric pressure sensor based on the capacitance value of the first capacitor.

The present disclosure provides a method for preparing a barometric pressure sensor, comprising:

providing a base substrate;

forming a first bottom electrode, a first insulating layer and a first top electrode sequentially on a side of the base substrate, wherein the first bottom electrode, the first insulating layer and the first top electrode constitute a first capacitor, the first top electrode is provided with a first opening which is configured to exposing the first insulating layer at a corresponding position, and a dielectric constant of the first insulating layer may vary with different humidity environments, so that a capacitance value of the first capacitor varies.

In some embodiments, the forming the first bottom electrode, the first insulating layer and the first top electrode sequentially on the side of the base substrate, comprises:

forming the first bottom electrode on the side of the base substrate;

forming a first insulating layer pattern on a side of the first bottom electrode away from the base substrate by a first patterning process;

performing plasma bombardment on the first insulating layer pattern to form nanofibers in the first insulating layer pattern, and obtaining the first insulating layer; and forming the first top electrode on a side of the first insulating layer away from the base substrate.

In some embodiments, after the obtaining the first insulating layer, the method further comprises:

forming a first sacrificial layer material on the side of the first insulating layer away from the base substrate, wherein an orthographic projection of the first sacrificial layer material on the base substrate at least covers an orthographic projection of the first insulating layer on the base substrate; and wherein the forming the first top electrode on the side of the first insulating layer away from the base substrate, comprises:

forming the first top electrode on a side of the first sacrificial layer material away from the base substrate by a second patterning process;

forming a first cavity and a first sacrificial layer between the first insulating layer and the first top electrode by etching the first sacrificial layer material through a first opening in the first top electrode, wherein an orthographic projection of the first cavity on the base substrate at least partially overlaps with an orthographic projection of the first opening on the base substrate, and an area of the orthographic projection of the first cavity on the base substrate is greater than an area of the orthographic projection of the first opening on the base substrate.

The above description is only an overview of the technical solution of the present application. In order to have a clearer understanding of the technical means of the present application, it can be implemented according to the content of the specification. In order to make the above and other purposes, features, and advantages of the present application more obvious and easier to understand, the specific implementations of the present application are listed below.

BRIEF DESCRIPTION OF THE DRAWINGS

In order to more clearly illustrate the technical solutions of the embodiments of the present application, the figures that are required to describe the embodiments of the present application will be briefly described below. Apparently, the figures that are described below are merely a part of the embodiments of the present application, and a person skilled in the art can obtain other figures according to these figures without paying creative work. It should be noted that the scale in the figures is only for illustrative purposes and do not represent the actual scale.

DETAILED DESCRIPTION

Figure 1:
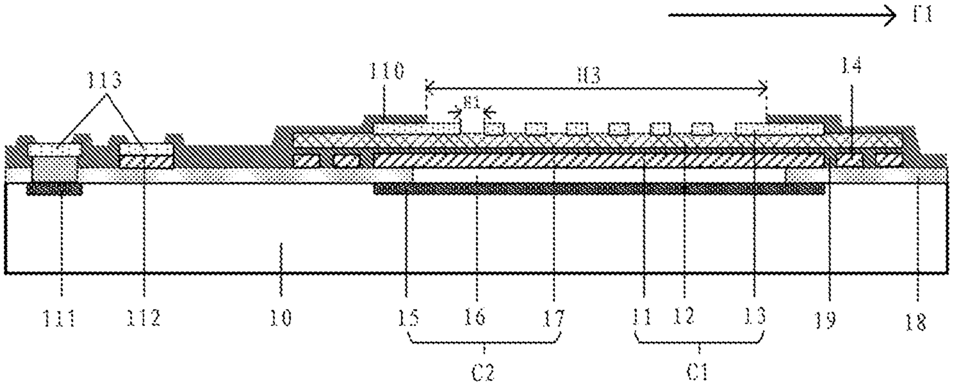
FIG. 1 exemplarily shows a schematic diagram of a cross-sectional structure of a first type of barometric pressure sensor.

The technical solutions according to the embodiments of the present application will be clearly and completely described below with reference to the drawings according to the embodiments of the present application. Apparently, the described embodiments are merely a part of the embodiments of the present application, rather than all of the embodiments. All of the other embodiments that a person skilled in the art obtains on the basis of the embodiments of the present application without paying creative work fall within the protection scope of the present application.

In order to save space and achieve multi-point and all-around monitoring, sensors are also developing towards miniaturization and high integration. Therefore, multifunction sensors that can measure multiple physical quantities have good application prospects. However, sensors with different functions often use different manufacturing and packaging processes, which often result in process constraints. Therefore, the integration of multifunction sensors is a research hotpot.

FIGS. 1 to 4 exemplarily show schematic diagrams of cross-sectional structures of several types of barometric pressure sensors provided in the present disclosure. As shown in any one of FIGS. 1 to 4, the barometric pressure sensor includes a base substrate 10 and a first capacitor C1 provided on a side of the base substrate 10. The first capacitor C1 includes a first bottom electrode 11 provided close to the base substrate 10; a first insulating layer 12 provided on a side of the first bottom electrode 11 away from the base substrate 10; and a first top electrode 13 provided on a side of the first insulating layer 12 away from the base substrate 10. The first top electrode 13 is provided with a first opening H1, which is configured to expose the first insulating layer 12 at a corresponding position. A dielectric constant of the first insulating layer 12 may vary with different humidity environments, so that a capacitance value of the first capacitor C1 varies.

Exemplarily, a material of the first insulating layer 12 includes at least one of polyimide, positive photoresist, negative photoresist, polydimethylsiloxane and a humidity-sensitive material with a dielectric constant varying with humidity.

In the present disclosure, in a normal direction of the base substrate 10, the first opening H1 is a through hole which passes through the first top electrode 13, so that the gas from the external environment can enter the first capacitor C1 through the first opening H1, and then come into contact with the first insulating layer 12.

As shown in any one of FIGS. 1 to 4, the first insulating layer 12 is equivalent to a dielectric layer of the first capacitor C1. When the first insulating layer 12 comes into contact with the gas from the external environment, it can absorb moisture in the gas, so that the dielectric constant varies, and the capacitance value of the first capacitor C1 varies. Based on the correspondence between a variation of the capacitance value of the first capacitor C1 and the humidity value, the humidity of the external environment may be obtained. Thus, the first capacitor C1 is equivalent to a Micro-electro-mechanical Systems (MEMS) hygrometer, which may be configured to detect the humidity of the external environment.

The barometric pressure sensor provided in the present disclosure has both barometric pressure test and humidity test functions, and integrates the MEMS hygrometer and barometer, thereby achieving the integration and miniaturization of the sensor, saving the manufacturing and packaging process steps, and saving costs. The barometric pressure sensor provided in the present disclosure may be configured to monitor environmental pressure and humidity in different scenarios.

Exemplarily, the base substrate 10 may be a silicon substrate, and the present disclosure is not limited thereto.

Exemplarily, the main material of the first bottom electrode 11 may be doped polysilicon or metal, etc. The metal may include, but is not limited to a simple substance such as aluminum, copper, silver, gold, etc., or an alloy.

Exemplarily, the first bottom electrode 11 may be prepared and patterned by a bonding process or a deposition process. The deposition process may include, for example, magnetron sputtering, chemical vapor deposition, etc.

Exemplarily, a main material of the first bottom electrode 11 is doped polysilicon, which may be formed by an in-situ doping low pressure chemical vapor deposition (LPCVD) process and annealing, or may be formed by depositing polysilicon by the LPCVD process, followed by ion implanting and annealing.

Exemplarily, the first insulating layer 12 may be prepared by a spin coating and photolithography process to form a pattern of the first insulating layer 12. Further, plasma bombardment is performed on the pattern of the first insulating layer 12, so that the material of the first insulating layer 12 forms nanofibers.

Exemplarily, on a plane parallel to the base substrate 10, a plurality of first openings H1 may be evenly arranged on the first top electrode 13.

Exemplarily, on the plane parallel to the base substrate 10, the plurality of first openings H1 are arranged in an array along a row direction and/or a column direction. That is, on the plane parallel to the base substrate 10, the plurality of first openings H1 may be arranged in an array along the row direction (as shown in panel a of FIG. 5), or arranged in an array along the column direction, or arranged in an array along both the row direction and the column direction (as shown in panel b and panel c of FIG. 5).

Exemplarily, on the plane parallel to the base substrate 10, the plurality of first openings H1 may be unevenly arranged on the first top electrode 13.

Exemplarily, a ratio of an area of an orthographic projection of the first opening H1 on the base substrate 10 to an area of an orthographic projection of the first top electrode 13 on the base substrate 10 is greater than or equal to 5% and less than or equal to 10%. In this way, while ensuring a sufficient contact area between the first insulating layer 12 and the gas from the external environment, an overlap area between the first top electrode 13 and the first bottom electrode 11 is prevented from being too small due to oversize of the first opening H1, thereby reducing the effect on the capacitance value of the first capacitor C1.

Exemplarily, a shape of the orthographic projection of the first opening H1 on the base substrate 10 includes at least one of a regular shape such as a sector, an ellipse and a polygon (e.g., a rectangle as shown in panel a of FIG. 5 and a square as shown in panel c of FIG. 5), and an irregular shape. The ellipse may include a circle (as shown in panel b of FIG. 5). The polygon may include a triangle, a quadrilateral, a pentagon, etc. The polygon may be chamfered or non-chamfered.

Exemplarily, a main material of the first top electrode 13 may be doped polysilicon or metal, etc. The metal may include, but is not limited to a simple substance such as aluminum, copper, silver, gold, etc., or an alloy.

Exemplarily, the first top electrode 13 may be prepared and patterned by the bonding process or the deposition process.

According to the above description, the first bottom electrode 11, the first insulating layer 12 and the first top electrode 13 may be prepared by a mature process, thereby improving the product yield.

In some embodiments, as shown in FIG. 1, a surface of the first insulating layer 12 away from the base substrate 10 and a surface of the first top electrode 13 close to the base substrate 10 are in contact with each other.

In FIG. 1, a surface of the first insulating layer 12 close to the first top electrode 13 is in direct contact with a surface of the first top electrode 13 close to the first insulating layer 12. Since there is no gap between the first insulating layer 12 and the first top electrode 13, a contact area between the first insulating layer 12 and the external environment is an exposed area of the first insulating layer 12 at the first opening H1.

Figure 2:
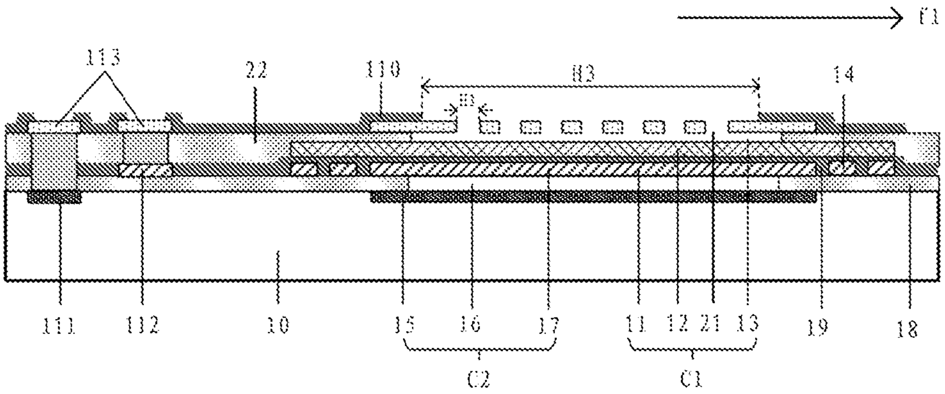
FIG. 2 exemplarily shows a schematic diagram of a cross-sectional structure of a second type of barometric pressure sensor.
Figure 3:
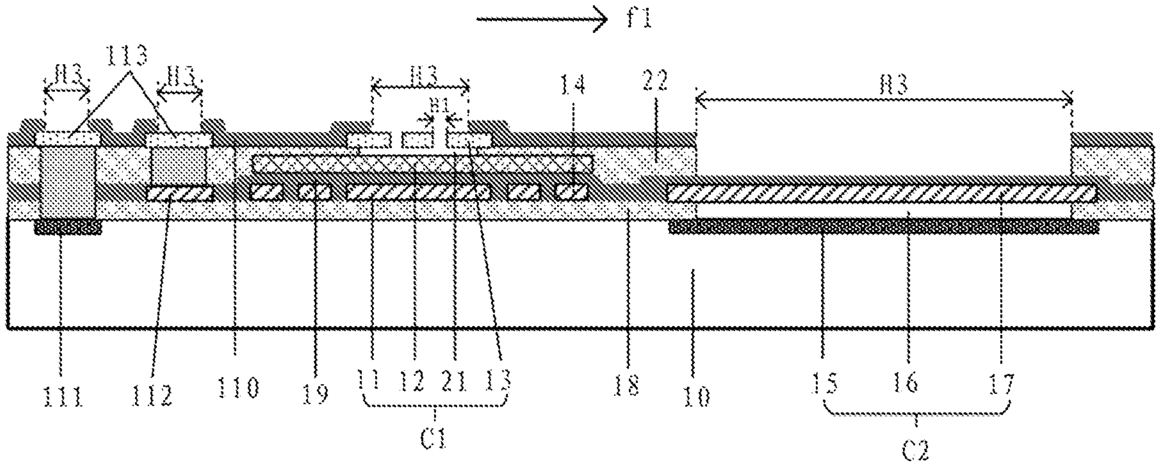
FIG. 3 exemplarily shows a schematic diagram of a cross-sectional structure of a third type of barometric pressure sensor.
Figure 4:
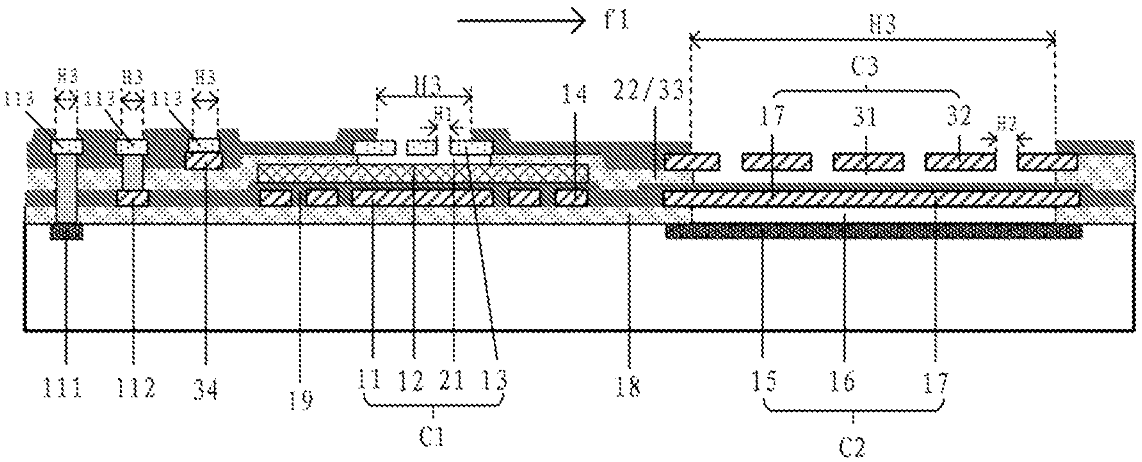
FIG. 4 exemplarily shows a schematic diagram of a cross-sectional structure of a fourth type of barometric pressure sensor.

In order to increase the contact area between the first insulating layer 12 and the external environment, in other embodiments, as shown in any one of FIGS. 2 to 4, the first capacitor C1 further includes a first cavity 21 provided between the first insulating layer 12 and the first top electrode 13. An orthographic projection of the first cavity 21 on the base substrate 10 at least partially overlaps with an orthographic projection of the first opening H1 on the base substrate 10, and an area of the orthographic projection of the first cavity 21 on the base substrate 10 is greater than the area of the orthographic projection of the first opening H1 on the base substrate 10.

As shown in any one of FIGS. 2 to 4, the first cavity 21 is communicated with the external environment through the first opening H1, and the gas from the external environment enters the first cavity 21 through the first opening H1. The first insulating layer 12 contacts the gas from the external environment gas as a cavity wall of the first cavity 21, so as to increase the contact area between the first insulating layer 12 and the external environment and improve the test accuracy and sensitivity.

In a specific implementation, a first sacrificial layer material may first be formed on the side of the first insulating layer 12 away from the base substrate 10. The first sacrificial layer material at least completely covers the first insulating layer 12. A first top electrode 13 with a first opening H1 may be formed on a side of the first sacrificial layer material away from the base substrate 10. The first cavity 21 and the first sacrificial layer 22 is formed between the first insulating layer 12 and the first top electrode 13 by pouring etching solution into the first opening H1 in the first top electrode 13 and etching the first sacrificial layer material.

Exemplarily, a material of the first sacrificial layer 22 may include silica. The first sacrificial layer 22 may be prepared by a process such as the LPCVD process or a plasma enhanced chemical vapor deposition (PECVD) process.

In some embodiments, as shown in any one of FIGS. 1 to 4, the barometric pressure sensor further includes a heating electrode 14, which is insulated from the first bottom electrode 11 and the first top electrode 13, respectively. An orthographic projection of the heating electrode 14 on the base substrate 10 does not overlap with the orthographic projection of the first bottom electrode 11 on the base substrate 10 and the orthographic projection of the first top electrode 13 on the base substrate 10. The orthographic projection of the heating electrode 14 on the base substrate 10 is within a range of the orthographic projection of the first insulating layer 12 on the base substrate 10.

As shown in any one of FIGS. 1 to 4, in the normal direction of the base substrate 10, the heating electrode 14 does not overlap with the first bottom electrode 11, and the heating electrode 14 does not overlap with the first top electrode 13, which may avoid the effect of the heating electrode 14 on the capacitance value of the first capacitor C1 and improve the accuracy of the humidity detection.

The heating electrode 14 is equivalent to a resistor. By energizing and heating the resistor, heat emitted from the resistor may evaporate the moisture in the first insulating layer 12, thereby achieving active dehumidification and eliminating an hysteresis effect of natural dehumidification. In the specific implementation, the heating electrode 14 may be periodically heated, and a heating period may be set according to actual needs.

In some embodiments, as shown in any one of FIGS. 1 to 4, the heating electrode 14 may be provided on the same layer and made of the same material as the first bottom electrode 11. In this way, the heating electrode 14 and the first bottom electrode 11 may be formed synchronously by the same process, thereby improving the preparing efficiency and simplifying preparing process steps.

Exemplarily, as shown in any one of FIGS. 1 to 4, the heating electrode 14 is a closed structure surrounding the first bottom electrode 11. That is, the heating electrode 14 is a closed and annular structure around the first bottom electrode 11. In this way, the first insulating layer 12 may be evenly heated in an annular direction.

In some embodiments, the heating electrode 14 may be provided on the same layer and made of the same material as the first top electrode 13. In this way, the heating electrode 14 and the first top electrode 13 may be formed synchronously by the same process, thereby improving the preparing efficiency and simplifying the preparing process steps.

Exemplarily, the heating electrode 14 is a closed structure surrounding the first top electrode 13. That is, the heating electrode 14 is a closed and annular structure around the first top electrode 13. In this way, the first insulating layer 12 may be evenly heated in an annular direction.

In some embodiments, as shown in any one of FIGS. 1 to 4, in a first direction f1 in the plane parallel to the base substrate 10, the barometric pressure sensor includes a plurality of heating electrodes 14 separated from each other. The first direction f1 is a direction from a center to an edge of the first insulating layer 12.

Providing the plurality of heating electrodes 14 separated from each other in the first direction f1 may improve the dehumidification efficiency of the first insulating layer 12 and the accuracy of the humidity detection.

Exemplarily, as shown in any one of FIGS. 1 to 4, in the first direction f1 in the plane parallel to the base substrate 10, the barometric pressure sensor includes a plurality of closed structures separated from each other. In FIGS. 1 to 4, the heating electrode 14 is a closed and annular structure, and two annular structures separated from each other are provided around the first bottom electrode 11.

In some embodiments, as shown in any one of FIGS. 1 to 4, the orthographic projection of the first insulating layer 12 on the base substrate 10 covers the orthographic projection of the first bottom electrode 11 on the base substrate 10 and the orthographic projection of the first top electrode 13 on the base substrate 10, respectively, and the orthographic projection of the first bottom electrode 11 on the base substrate 10 at least partially overlaps with the orthographic projection of the first top electrode 13 on the base substrate 10.

Exemplarily, in FIGS. 1 to 4, the orthographic projection of the first bottom electrode 11 on the base substrate 10 is within a boundary of the orthographic projection of the first insulating layer 12 on the base substrate 10, and the orthographic projection of the first top electrode 13 on the base substrate 10 is within a boundary of the orthographic projection of the first insulating layer 12 on the base substrate 10.

Exemplarily, in FIGS. 1 to 4, the boundary of the orthographic projection of the first bottom electrode 11 on the base substrate 10 is substantially aligned with an outer contour of the orthographic projection of the first top electrode 13 on the base substrate 10, and the present disclosure is not limited thereto.

In some embodiments, as shown in any one of FIGS. 1 to 4, the barometric pressure sensor further includes a second capacitor C2 provided on the same side of the base substrate 10 as the first capacitor C1. The second capacitor C2 includes a second bottom electrode 15 provided close to the base substrate 10; a second cavity 16 provided on a side of the second bottom electrode 15 away from the base substrate 10; and a second top electrode 17 provided on a side of the second cavity 16 away from the base substrate 10. The second cavity 16 is a sealed cavity, and the second top electrode 17 may deform under an action of external barometric pressure, so that the capacitance value of the second capacitor C2 varies.

Under the action of external barometric pressure, the second top electrode 17 deforms in a direction close to the second bottom electrode 15 or away from the second bottom electrode 15, so that a distance between the second top electrode 17 and the second bottom electrode 15 changes, that is, the spacing between two plates of the second capacitor C2 changes. The second cavity 16 provides a space for the second top electrode 17 to deform. Since the capacitance value of the second capacitor C2 is negatively correlated with the distance between the two plates, that is, the capacitance value of the second capacitor C2 increases as the distance between the second top electrode 17 and the second bottom electrode 15 decreases, and the capacitance value of the second capacitor C2 decreases as the distance between the second top electrode 17 and the second bottom electrode 15 increases. Thus, the external barometric pressure value may be obtained according to the correspondence between the variation in the capacitance value of the second capacitor C2 and the barometric pressure value.

Exemplarily, the second cavity 16 may be a vacuum cavity, and the present disclosure is not limited thereto.

Exemplarily, a main material of the second bottom electrode 15 may be doped polysilicon or metal, etc. The metal may include, but is not limited to a simple substance such as aluminum, copper, silver, gold, etc., or an alloy.

In some examples, the base substrate 10 is a silicon substrate, and predetermined regions of the base substrate 10 are doped to form the second bottom electrode 15, so that the second bottom electrode 15 is embedded within the base substrate 10.

In other examples, the second bottom electrode 15 may be prepared and patterned by the bonding process or the deposition process. In this way, the second bottom electrode 15 is provided between the base substrate 10 and the second cavity 16.

Exemplarily, the main material of the second bottom electrode 15 is doped polysilicon, which may be formed by the in-situ doping LPCVD process and annealing, or formed by depositing polysilicon by the LPCVD process, followed by ion implantation and annealing.

Exemplarily, a main material of the second top electrode 17 may be doped polysilicon or metal, etc. The metal may include, but is not limited to a simple substance such as aluminum, copper, silver, gold, etc, or an alloy.

Exemplarily, the second top electrode 17 may be prepared and patterned by the bonding process or the deposition process.

Exemplarily, a main material of the second top electrode 17 is doped polysilicon, which may be formed by the in-situ doping LPCVD process and annealing, or formed by depositing polysilicon by the LPCVD process, followed by ion implantation and annealing.

Exemplarily, as shown in any one of FIGS. 1 to 4, a second sacrificial layer material may first be formed on a side of the second bottom electrode 15 away from the base substrate 10. The second sacrificial layer material at least completely covers the second bottom electrode 15. An initial second top electrode with an etching hole is then formed on a side of the second sacrificial layer material away from the base substrate 10. The second cavity 16 and the second sacrificial layer 18 are formed by pouring the etching solution into the etching hole and etching the second sacrificial layer material. The sealed second cavity 16 and the second top electrode 17 are formed by sealing the etching hole in the initial second top electrode.

Exemplarily, a material of the second sacrificial layer 18 may include silica. The second sacrificial layer 18 may be prepared by a process such as the LPCVD or PECVD process.

In some embodiments, as shown in FIG. 4, the barometric pressure sensor further includes a third cavity 31 provided on a side of the second top electrode 17 away from the base substrate 10; and a third top electrode 32 provided on a side of the third cavity 31 away from the base substrate 10. The second top electrode 17, the third cavity 31 and the third top electrode 32 constitute the third capacitor C3, and the third top electrode 32 is provided with a second opening H2, which is configured to communicate the external environment with the third cavity 31.

As shown in FIG. 4, in the normal direction of the base substrate 10, the second opening H2 is a through hole which passes through the third top electrode 32, so that the gas from the external environment enters the third cavity 31 through the second opening H2, and the external barometric pressure acts on the second top electrode 17.

As shown in FIG. 4, the third cavity 31 is communicated with the external environment through the second opening H2, so that the third top electrode 32 does not deform due to the balance of upper and lower barometric pressure, while the second top electrode 17 deforms under the action of the barometric pressure. When the second top electrode 17 deforms towards the side close to the second bottom electrode 15, the spacing between the two plates of the second capacitor C2 decreases, while the spacing between the two plates of the third capacitor C3 increases, so that the capacitance value of the second capacitor C2 increases, and the capacitance value of the third capacitor C3 decreases. When the second top electrode 17 deforms towards the side away from the second bottom electrode 15, the spacing between the two plates of the second capacitor C2 increases, and the spacing between the two plates of the third capacitor C3 decreases, so that the capacitance value of the second capacitor C2 decreases and the capacitance value of the third capacitor C3 increases. When the second top electrode 17 deforms, variations in the capacitance values of the second capacitor C2 and the third capacitor C3 are opposite, so that the external barometric pressure value may be determined based on the difference between the capacitance value of the second capacitor C2 and the capacitance value of the third capacitor C3. In this way, the effect of noise may be eliminated, and the detection sensitivity and accuracy may be improved.

In some embodiments, on the plane parallel to the base substrate 10, the plurality of second openings H2 are evenly arranged on the third top electrode 32.

In some embodiments, on the plane parallel to the base substrate 10, the plurality of second openings H2 are arranged in an array along the row direction and/or the column direction. That is, on the plane parallel to the base substrate 10, the plurality of second openings H2 may be arranged in an array along the row direction (as shown in panel a of FIG. 6), or along the column direction, or along both the row direction and the column direction (as shown in panels b and c of FIG. 6).

It should be noted that the plurality of second openings H2 may also be unevenly arranged on the third top electrode 32 on the plane parallel to the base substrate 10.

In some embodiments, a ratio of an area of an orthographic projection of the second opening H2 on the base substrate 10 to an area of an orthographic projection of the third top electrode 32 on the base substrate 10 is greater than or equal to 5% and less than or equal to 10%. In this way, while ensuring that the third cavity 31 is communicated with the external environment, the overlap area between the second top electrode 17 and the third top electrode 32 is prevented from being too small due to oversize of the second opening H2, thereby reducing the effect on the capacitance value of the third capacitor C3.

In some embodiments, a shape of the orthographic projection of the second opening H2 on the base substrate 10 includes at least one of a regular shape such as a sector, an ellipse, a polygon (such as a rectangle as shown in panel a of FIG. 6, and a square as shown in panel c of FIG. 6), and an irregular shape. The ellipse may include a circle (as shown in panel b of FIG. 6). The polygon may include a triangle, a quadrilateral and a pentagon, etc. The polygon may be chamfered or non-chamfered.

Exemplarily, a main material of the third top electrode 32 may be doped polysilicon or metal, etc. The metal may include, but is not limited to a simple substance such as aluminum, copper, silver, gold, etc., or an alloy.

Exemplarily, the third top electrode 32 may be prepared and patterned by the bonding process or the deposition process.

Exemplarily, the main material of the third top electrode 32 is doped polysilicon, which may be formed by the in-situ doping LPCVD process and annealing, or formed by depositing polysilicon by the LPCVD process, followed by ion implantation and annealing.

Exemplarily, a third sacrificial layer material may be first formed on a side of the second top electrode 17 away from the base substrate 10. The third sacrificial layer material at least completely covers the second top electrode 17. The third top electrode 32 with the second opening H2 is formed on a side of the third sacrificial layer material away from the base substrate 10. The second cavity 16 and the third sacrificial layer 33 is formed between the second top electrode 17 and the third top electrode 32 by pouring the etching solution into the second opening H2 in the third sacrificial layer material and etching the third sacrificial layer material.

Exemplarily, a material of the third sacrificial layer 33 may include silica. The third sacrificial layer 33 may be prepared by a process such as the LPCVD or PECVD process.

Exemplarily, as shown in FIG. 4, the third sacrificial layer 33 may be provided on the same layer and made of the same material as the first sacrificial layer 22, so that the first cavity 21 and the second cavity 16 may be formed synchronously.

In some embodiments, as shown in any of FIGS. 1 to 4, the first bottom electrode 11 is provided on the same layer as the second top electrode 17. Further, the first bottom electrode 11 and the second top electrode 17 may also be made of the same material.

Exemplarily, in FIGS. 1 and 2, the first bottom electrode 11 and the second top electrode 17 share the same electrode, thereby reducing the preparation of one film layer, simplifying the process and improving the preparing efficiency.

Exemplarily, in FIG. 3 or FIG. 4, the first bottom electrode 11 and the second top electrode 17 are two electrodes provided on the same layer and separated from each other, which may avoid signal interference due to sharing electrodes, and improve the accuracy of barometric pressure and humidity detection.

It should be noted that the first bottom electrode 11 and the second top electrode 17 may also be provided on different layers, and the present disclosure is not limited thereto.

In some embodiments, as shown in FIG. 1 or FIG. 2, the second capacitor C2 is provided between the first capacitor C1 and the base substrate 10. The orthographic projection of the first capacitor C1 on the base substrate 10 at least partially overlaps with an orthographic projection of the second capacitor C2 on the base substrate 10. That is, in the normal direction of the base substrate 10, the first capacitor C1 and the second capacitor C2 may partially overlap or completely overlap.

In this way, the first capacitor C1 and the second capacitor C2 are integrated vertically, which may further reduce the size of the barometric pressure sensor and facilitate device miniaturization.

Exemplarily, as shown in FIG. 1 or FIG. 2, the second top electrode 17 and the first bottom electrode 11 may share the same electrode. The second top electrode 17 and the first bottom electrode 11 may also be provided independently of each other, for example, the second top electrode 17 and the first bottom electrode 11 may be provided on different layers.

In FIGS. 1 and 2, the second top electrode 17 and the first capacitor C1 provided above it, as a whole, deform under the action of external barometric pressure.

In some embodiments, as shown in FIG. 3 or FIG. 4, the orthographic projection of the first capacitor C1 on the base substrate 10 does not overlap with the orthographic projection of the second capacitor C2 on the base substrate 10. That is, in the normal direction of the base substrate 10, the first capacitor C1 and the second capacitor C2 may not overlap with each other.

In this way, the first capacitor C1 and the second capacitor C2 are integrated horizontally, which may further reduce the thickness of the barometric pressure sensor, avoid interference between the humidity detection and the barometric pressure detection, and improve the detection accuracy.

The second capacitor C2 as shown in FIGS. 1 to 3 constitutes a monolayer membrane barometer, and the second capacitor C2 and the third capacitor C3 as shown in FIG. 4 constitute a differential membrane barometer. The hygrometer constituted by the first capacitor C1 may be provided above the single-layer film barometer (as shown in FIGS. 1 and 2) or to the side of the single-layer film barometer (as shown in FIG. 3), and the hygrometer constituted by the first capacitor C1 may be provided to the side of the differential film barometer (as shown in FIG. 4).

In some embodiments, as shown in any one of FIGS. 1 to 4, the orthographic projections of the second bottom electrode 15 and the second top electrode 17 on the base substrate 10 both cover the orthographic projection of the second cavity 16 on the base substrate 10, and the orthographic projection of the second bottom electrode 15 on the base substrate 10 at least partially overlaps with the orthographic projection of the second top electrode 17 on the base substrate 10.

As shown in any one of FIGS. 1 to 4, the orthographic projection of the second cavity 16 on the base substrate 10 is within a boundary of the orthographic projection of the second bottom electrode 15 on the base substrate 10, and the orthographic projection of the second cavity 16 on the base substrate 10 is within a boundary of the orthographic projection of the second top electrode 17 on the base substrate 10.

Exemplarily, in FIGS. 1 to 4, the orthographic projection of the second bottom electrode 15 on the base substrate 10 completely overlaps with the orthographic projection of the second top electrode 17 on the base substrate 10, and the present disclosure is not limited thereto.

In some embodiments, as shown in FIG. 4, the orthographic projection of the second top electrode 17 on the base substrate 10 covers the orthographic projection of the third cavity 31 on the base substrate 10, the orthographic projection of the third cavity 31 on the base substrate 10 is within an outer contour of the orthographic projection of the third top electrode 32 on the base substrate 10, and the orthographic projection of the second top electrode 17 on the base substrate 10 at least partially overlaps with the orthographic projection of the third top electrode 32 on the base substrate 10.

As shown in FIG. 4, the orthographic projection of the third cavity 31 on the base substrate 10 is within a boundary of the orthographic projection of the second top electrode 17 on the base substrate 10, and the orthographic projection of the third cavity 31 on the base substrate 10 is within an outer contour of the orthographic projection of the third top electrode 32 on the base substrate 10.

In some embodiments, as shown in any one of FIGS. 1 to 4, the barometric pressure sensor further includes a second insulating layer 19 provided between the first bottom electrode 11 and the first insulating layer 12, and an orthographic projection of the second insulating layer 19 on the base substrate 10 at least partially covers the orthographic projection of the first bottom electrode 11 on the base substrate 10.

In FIGS. 1 to 4, the second insulating layer 19 completely covers the first bottom electrode 11 and the heating electrode 14, and the second insulating layer 19 also fills the gap between the first bottom electrode 11 and the heating electrode 14, as well as the gap between adjacent heating electrodes 14. Providing the second insulating layer 19 may avoid short circuits between different electrodes, and appropriately reduce the lateral spacing between adjacent electrodes, which is conducive to further miniaturization of the sensor.

In FIG. 3, the second insulating layer 19 further extends above the second capacitor C2 and is provided on the side of the second top electrode 17 away from the base substrate 10.

In FIG. 4, the second insulating layer 19 further extends above the second capacitor C2 and is provided between the second top electrode 17 and the third cavity 31, which prevents a short circuit between the second top electrode 17 and the third top electrode 32.

In some embodiments, as shown in any one of FIGS. 1 to 4, the barometric pressure sensor further includes a third insulating layer 110 provided on the side of the first top electrode 13 away from the base substrate 10. The third insulating layer 110 is provided with a third opening H3. An orthographic projection of the third opening H3 on the base substrate 10 at least partially overlaps with the orthographic projection of the first opening H1 on the base substrate 10.

As shown in any one of FIGS. 1 to 4, in the normal direction of the base substrate 10, the third opening H3 is a through hole which passes through the third insulating layer 110.

Exemplarily, as shown in any one of FIGS. 1 to 4, in the normal direction of the base substrate 10, the third opening H3 completely covers the first opening H1 and the first top electrode 13 around the first opening H1, which ensures that the gas from the external environment enters the first insulating layer 12 through the first opening H1 without hindrance.

Exemplarily, in FIGS. 3 and 4, the orthographic projection of the third opening H3 on the base substrate 10 at least partially overlaps with the orthographic projection of the second top electrode 17 on the base substrate 10.

As shown in any one of FIGS. 1 to 4, the barometric pressure sensor may further include: a first signal connection area 111, provided on the same layer as the second bottom electrode 15; a second signal connection area 112, provided on the same layer as the first bottom electrode 11 and the second top electrode 17; and a plurality of lead bonding areas 113, provided on the same layer as the first top electrode 13. In FIG. 4, the barometric pressure sensor further includes a third signal connection area 34 provided on the same layer as the third top electrode 32 and connected to each other. As shown in FIGS. 1 to 4, the plurality of lead bonding areas 113 are connected to different signal connection areas directly or through vias. The via area may be filled with metal or polysilicon.

The lead bonding area 113 may be connected to a detection circuit. The detection circuit may determine an environment humidity around the barometric pressure sensor based on the capacitance value of the first capacitor C1, and may also determine a barometric pressure around the barometric pressure sensor based on the capacitance value of the second capacitor C2, or the capacitance values of the second capacitor C2 and the third capacitor C3.

As shown in any one of FIGS. 1 to 4, the second insulating layer 19 and the third insulating layer are provided with openings at positions corresponding to the first signal connection area 111, the second signal connection area 112 and the third signal connection area 34, respectively, so as to connect with the lead bonding area 113. In addition, the second insulating layer 19 and the third insulating layer are also provided with openings at a position of the lead bonding area 113, respectively, so as to connect with the detection circuit.

Exemplarily, materials of the second insulating layer 19 and the third insulating layer 110 may include one or more of insulating materials such as silicon nitride, silicon oxide, or silicon nitride oxide, respectively.

Figure 5:
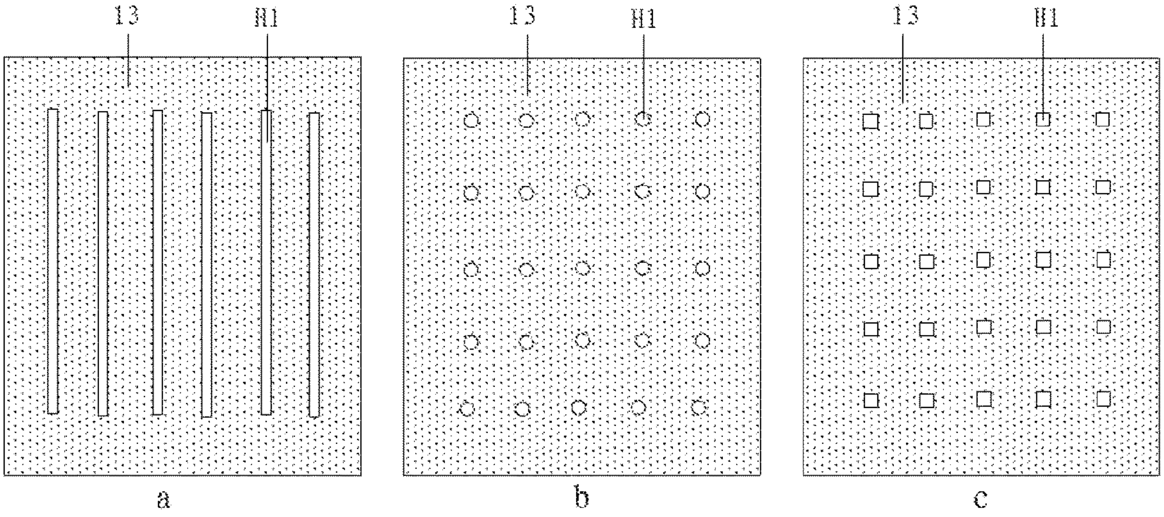
FIG. 5 exemplarily shows a schematic diagram of a planar structure of a first top electrode.
Figure 6:
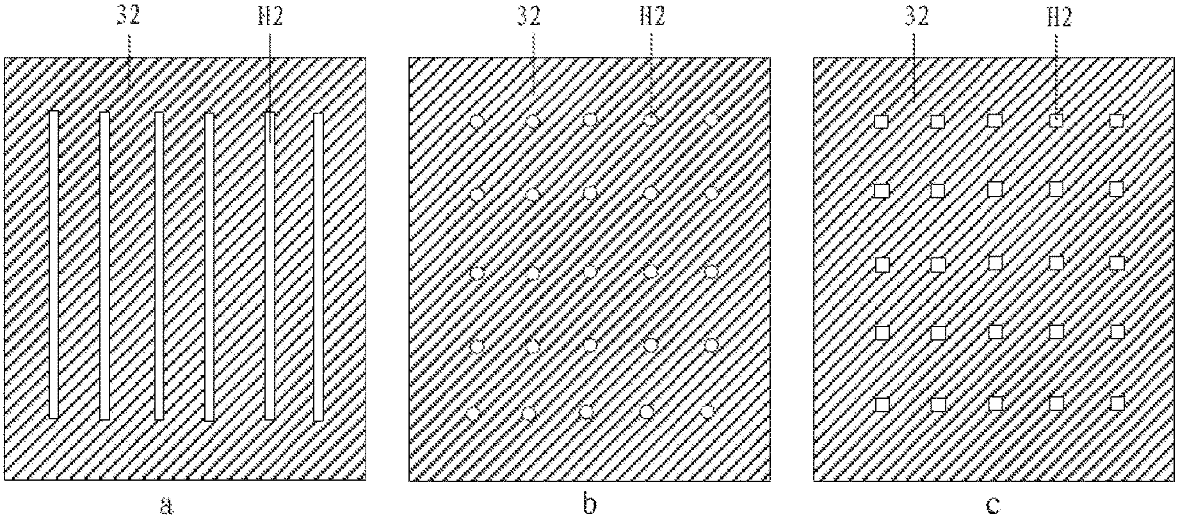
FIG. 6 exemplarily shows a schematic diagram of a planar structure of a third top electrode.

Exemplarily, shapes of the orthographic projections of the first bottom electrode 11, the first insulating layer 12, the first top electrode 13, the first cavity 21, the second bottom electrode 15, the second cavity 16, the second top electrode 17, the third cavity 31 and the third top electrode 32 on the base substrate 10, respectively, may include at least one of regular shapes such as a circle, a sector, an ellipse, a rectangle, a rectangle with chamfered corners, etc., and irregular shapes. In FIG. 5, a shape of the orthographic projection of the first top electrode 13 on the base substrate 10 is a rectangle. In FIG. 6, a shape of the orthographic projection of the third top electrode 32 on the base substrate 10 is a rectangle.

The present disclosure also provides an electronic device including a barometric pressure sensor as provided in any one of the embodiments; and a detection circuit connected to the barometric pressure sensor for determining an environment humidity around the barometric pressure sensor based on the capacitance value of the first capacitor C1.

It will be appreciated by those skilled in the art that the electronic device has the advantages of the above barometric pressure sensor.

In some embodiments, the electronic device may, for example, include a mobile phone, a smart home device, an autonomous driving device, a digital camera, a tablet, a laptop, a navigator, a portable camcorder, a viewfinder, a vehicle, a large area wall, a screen of theater, or a stadium sign.

The present disclosure also provides a method for preparing a barometric pressure sensor. The method includes steps S01-S02.

In step S01, a base substrate 10 is provided.

In step S02, a first bottom electrode 11, a first insulating layer 12 and a first top electrode 13 are formed sequentially on a side of the base substrate 10. The first bottom electrode 11, the first insulating layer 12 and the first top electrode 13 constitute a first capacitor C1, and the first top electrode 13 is provided with a first opening H1 which is configured to expose the first insulating layer 12 at a corresponding position. A dielectric constant of the first insulating layer 12 may vary with different humidity environments, so that the capacitance value of the first capacitor C1 varies.

The barometric pressure sensor provided in any one of the embodiments can be prepared by the preparing method provided in the present disclosure.

In some embodiments, step S02 may specifically include steps S11-S14.

In step S11, a first bottom electrode 11 is formed on a side of the base substrate 10.

Exemplarily, the first bottom electrode 11 may be prepared and patterned by a bonding process or a deposition process. The deposition process may, for example, include magnetron sputtering, chemical vapor deposition, etc.

In step S12, a pattern of the first insulating layer 12 is formed on a side of the first bottom electrode 11 away from the base substrate 10 by a first patterning process.

Exemplarily, the first patterning process may include a spin-coating process and a photolithography process, and the present disclosure is not limited thereto.

In step S13, plasma bombardment is performed on the pattern of the first insulating layer 12 to form nanofibers in the pattern of the first insulating layer 12, and the first insulating layer 12 is obtained.

In step S14, a first top electrode 13 is formed on a side of the first insulating layer 12 away from the base substrate 10.

Exemplarily, the first top electrode 13 may be prepared and patterned by the bonding process or the deposition process.

In some embodiments, after step S13, the preparing method further includes step S21.

In step S21, a first sacrificial layer material is formed on a side of the first insulating layer 12 away from the base substrate 10. An orthographic projection of the first sacrificial layer material on the base substrate 10 at least covers an orthographic projection of the first insulating layer 12 on the base substrate 10.

Accordingly, the step S14 may specifically include steps S22-S23.

In step S22, the first top electrode 13 is formed on a side of the first sacrificial layer material away from the base substrate 10 by a second patterning process.

Exemplarily, the second patterning process may include the deposition process and the photolithography process, and the present disclosure is not limited thereto.

In step S23, the first cavity 21 and the first sacrificial layer 22 is formed between the first insulating layer 12 and the first top electrode 13 by etching the first sacrificial layer material through the first opening H1 in the first top electrode 13. An orthographic projection of the first cavity 21 on the base substrate 10 at least partially overlaps with an orthographic projection of the first opening H1 on the base substrate 10, and an area of the orthographic projection of the first cavity 21 on the base substrate 10 is greater than the area of the orthographic projection of the first opening H1 on the base substrate 10.

Exemplarily, the etching solution may be injected at the first opening H1 to etch the first sacrificial layer material.

In FIG. 6, a process for preparing the barometric pressure sensor shown in FIG. 1 is described exemplarily below. The preparing process specifically includes steps S31-S38.

In step S31, a second bottom electrode 15 and a first signal connection area 111 are prepared and formed on the base substrate 10 by an injection process, or the deposition and the photolithography process.

In step S32, a second sacrificial layer material is formed on a surface of the second bottom electrode 15 away from the base substrate 10.

In step S33, an initial second top electrode 17 (with an etching hole), a heating electrode 14 and a second signal connection area 112 are prepared, patterned and formed on a surface of the second sacrificial layer material away from the base substrate 10 by the bonding process or the deposition process.

In step S34, a second cavity 16 and a second sacrificial layer 18 are formed by injecting the etching solution into the etching hole and etching the second sacrificial layer material, and a second top electrode 17 (or a first bottom electrode 11) is obtained by sealing the etching hole.

Figure 7:
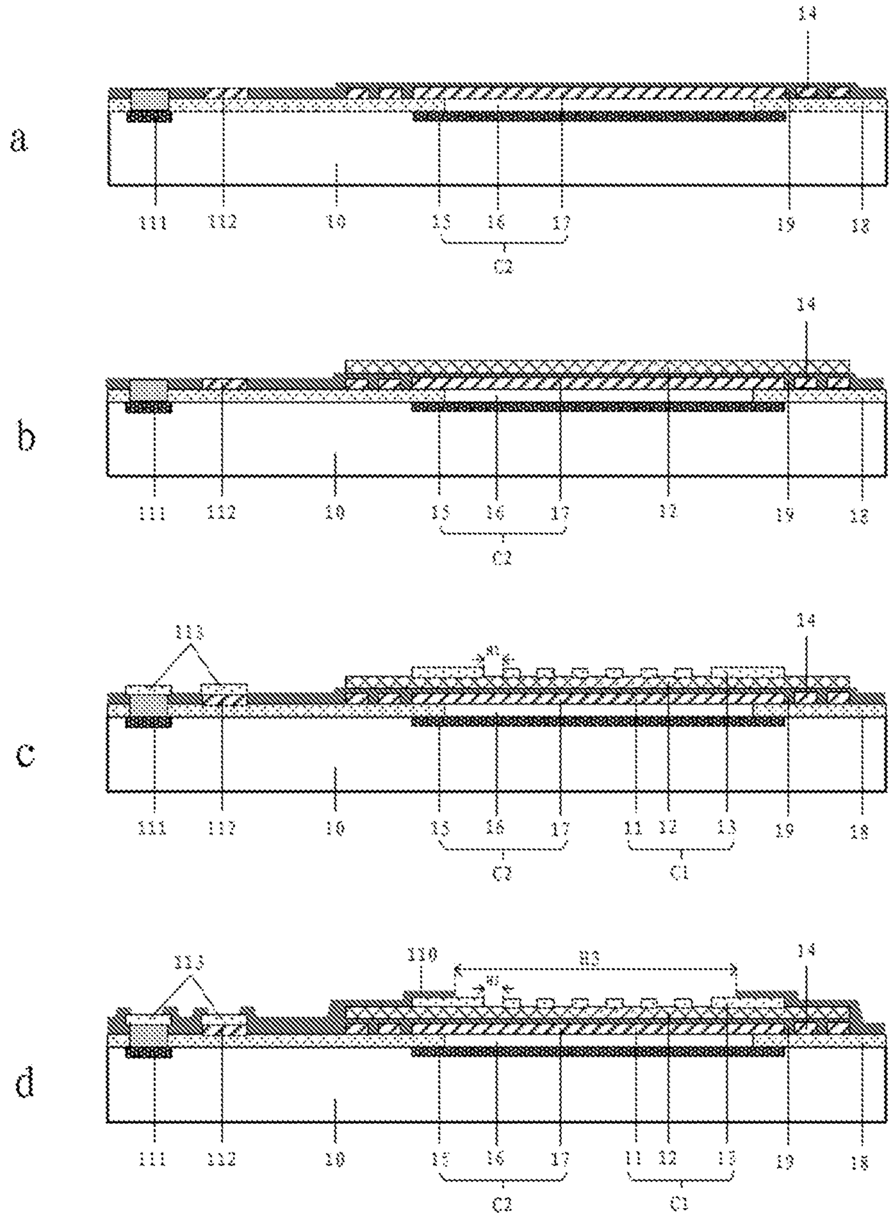
FIG. 7 exemplarily shows a schematic diagram of a preparing process for the first type of barometric pressure sensor.

In step S35, a second insulating layer 19 is formed on surfaces of the second top electrode 17 and the heating electrode 14 away from the base substrate 10 by a low temperature chemical vapor deposition process and the photolithography process. In panel a of FIG. 7, a schematic diagram of a cross-sectional structure of the barometric pressure sensor where the step has been completed is shown.

In step S36, a pattern of the first insulating layer 12 is formed by spin-coating and photolithographically etching a first insulating layer material on a surface of the second insulating layer 19 away from the base substrate 10. Plasma bombardment is then performed on the pattern of the first insulating layer 12 to form nanofibers in the first insulating layer 12. In panel b of FIG. 7, a schematic diagram of a cross-sectional structure of the barometric pressure sensor where the step has been completed is shown.

In step S37, a first top electrode 13 and a lead bonding area 113 is formed by sputtering and patterning the metal layer on a surface of the first insulating layer 12 away from the base substrate 10. In panel c of FIG. 7, a schematic diagram of a cross-sectional structure of the barometric pressure sensor where the step has been completed is shown.

In step S38, a third insulating layer 110 is formed on a surface of the first top electrode 13 away from the base substrate 10 by the low temperature chemical vapor deposition process and the photolithography process. In panel d of FIG. 7, a schematic diagram of a cross-sectional structure of the barometric pressure sensor where the step has been completed is shown.

Figure 8:
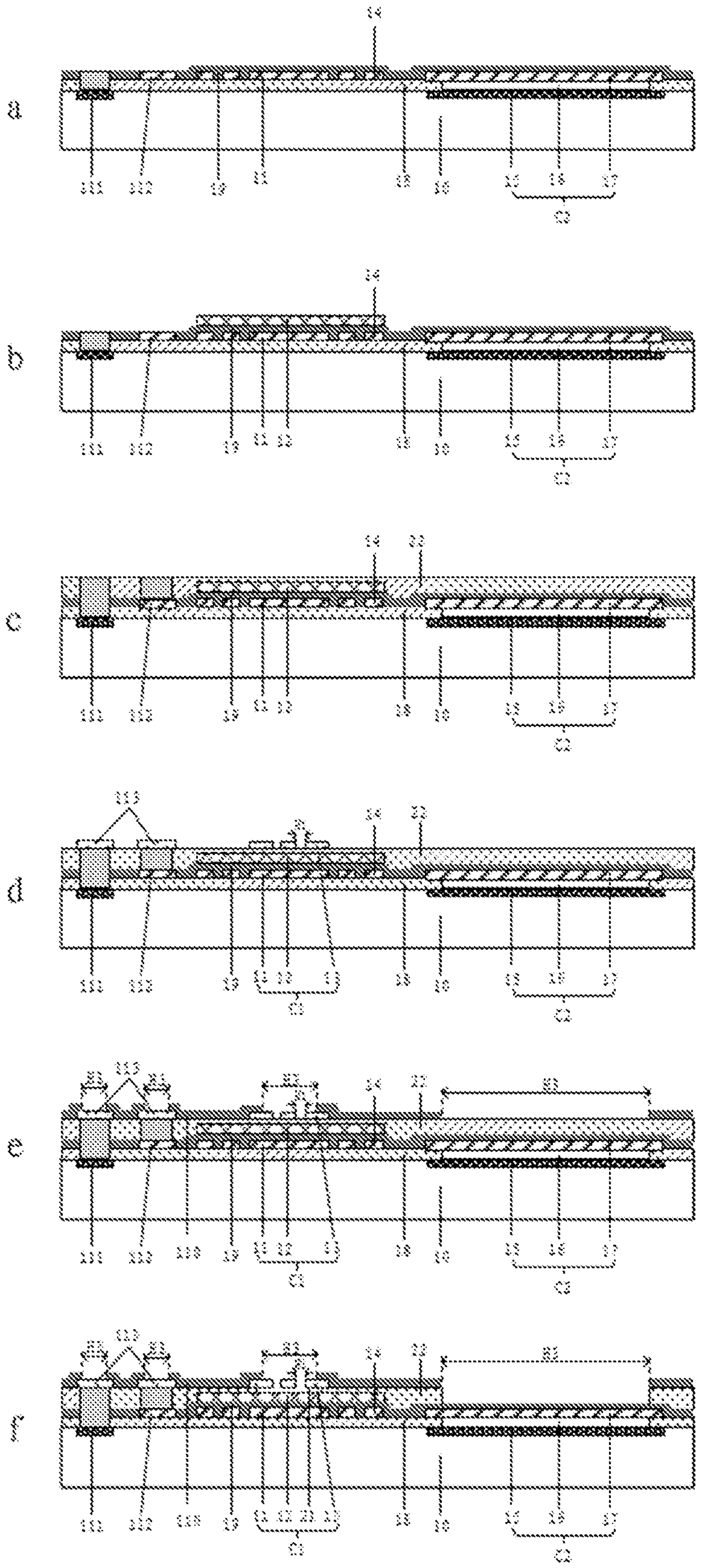
FIG. 8 exemplarily shows a schematic diagram of a preparing process for the third type of barometric pressure sensor.

In FIG. 8, a process for preparing the barometric pressure sensor shown in FIG. 3 is described exemplarily below. The preparing process specifically includes steps S41-S410:

In step S41, a second bottom electrode 15 and a first signal connection area 111 are prepared and formed on the base substrate 10 by the injection process, or the deposition process and the photolithography process.

In step S42, a second sacrificial layer material is formed on a surface of the second bottom electrode 15 away from the base substrate 10.

In step S43, an initial second top electrode 17 (with an etching hole), a first bottom electrode 11, a heating electrode 14 and a second signal connection area 112 are prepared, patterned and formed on a surface of the second sacrificial layer material away from the base substrate 10 by the bonding process or the deposition process.

In step S44, a second cavity 16 and a second sacrificial layer 18 are formed by injecting the etching solution into the etching hole and etching the second sacrificial layer material, and a second top electrode 17 is obtained by sealing the etching hole.

In step S45, a second insulating layer 19 is formed on surfaces of the second top electrode 17, the first bottom electrode 11 and the heating electrode 14 away from the base substrate 10 by the low temperature chemical vapor deposition process and the photolithography process. In panel a of FIG. 8, a schematic diagram of a cross-sectional structure of the barometric pressure sensor where the step has been completed is shown.

In step S46, a pattern of the first insulating layer 12 is formed by spin-coating and photolithographically etching a first insulating layer material on a surface of the second insulating layer 19 away from the base substrate 10. Plasma bombardment is then performed on the pattern of the first insulating layer 12 to form nanofibers in the first insulating layer 12. In panel b of FIG. 8, a schematic diagram of a cross-sectional structure of the barometric pressure sensor where the step has been completed is shown.

In step S47, a first sacrificial layer material is formed on a surface of the first insulating layer 12 away from the base substrate 10. In panel c of FIG. 8, a schematic diagram of a cross-sectional structure of the barometric pressure sensor where the step has been completed is shown.

In step S48, a first top electrode 13 and a lead bonding area 113 is formed by sputtering and patterning a metal layer on a surface of the first sacrificial layer material away from the base substrate 10. In panel d of FIG. 8, a schematic diagram of a cross-sectional structure of the barometric pressure sensor where the step has been completed is shown.

In step S49, a third insulating layer 110 is formed on a surface of the first top electrode 13 away from the base substrate 10 by the low temperature chemical vapor deposition process and the photolithography process. In panel e of FIG. 8, a schematic diagram of a cross-sectional structure of the barometric pressure sensor where the step has been completed is shown.

In step S410, a first cavity 21 and a first sacrificial layer 22 are formed by injecting the etching solution into a third opening H3 in the third insulating layer 110 and a first opening H1 in the first top electrode 13, and etching the first sacrificial layer material. In panel f of FIG. 8, a schematic diagram of a cross-sectional structure of the barometric pressure sensor where the step has been completed is shown. The first sacrificial layer material provided above the second top electrode 17 may be simultaneously etched away.

It should be noted that the preparing method may also include more steps, which may be determined based on actual needs, and the present disclosure is not limited thereto. A detailed explanation and the technical effect of the preparing method may be found in the above description of the barometric pressure sensor, which will not be repeated here.

In the present disclosure, unless stated otherwise, the meaning of "multiple" is "two or more", and the meaning of "at least one" is "one or more".

In the present disclosure, an orientation or positional relationship indicated by terms "upper" and "lower" is based on an orientation or positional relationship shown in the drawings, and is merely for convenience of describing the present disclosure and simplifying the description, rather than indicates or implies that the device or element referred to must have a specific orientation, be configured and operated in a specific orientation, and thus cannot be understood as limitation on the present disclosure.

In the present disclosure, the terms "including", "comprising" or any variations thereof are intended to embrace a non-exclusive inclusion, such that a process, method, article, or terminal device including a plurality of elements includes not only those elements but also includes other elements not expressly listed, or also includes elements inherent to such a process, method, article, or device. In the absence of further limitation, an element defined by the phrase "including a . . . " does not exclude the presence of additional identical element in the process, method, article, or device.

In the present disclosure, the terms "one embodiment", "some embodiments", "exemplary embodiments", "example", "one example" or "some examples" are intended to indicate that specific features, structures, materials or characteristics related to the embodiment or example are comprised in at least one embodiment or example of the present application. The illustrative indication of the above terms does not necessarily refer to the same one embodiment or example. Moreover, the specific features, structures, materials or characteristics may be comprised in any one or more embodiments or examples in any suitable manner.

In the present disclosure, the relational terms such as first and second are used only to distinguish one entity or operation from another without necessarily requiring or implying any such actual relationship or order between these entities or operations.

In the description on some embodiments, "couple" and "connect" and the derivatives thereof may be used. For example, in the description on some embodiments, the term "connect" may be used to indicate that two or more components directly physically contact or electrically contact. As another example, in the description on some embodiments, the term "couple" may be used to indicate that two or more components directly physically contact or electrically contact. However, the term "couple" or "communicatively coupled" may also indicate that two or more components do not directly contact, but still cooperate with each other or act on each other. The embodiments disclosed herein are not necessarily limited by the contents herein.

"At least one of A, B and C" and "at least one of A, B or C" have the same meaning, and both of them include the following combinations of A, b and C: solely A, solely B, solely C, the combination of A and B, the combination of A and C, the combination of B and C, and the combination of A, B and C.

"A and/or B" include the following three combinations: solely A, solely B, and the combination of A and B.

As used herein, with reference to the context, the term "if" is optionally interpreted as meaning "when" or "in response to determining that" or "in response to detecting that". Similarly, with reference to the context, the phrase "if it is determined that" or "if the stated condition or event has been detected" is optionally interpreted as referring to "when it is determined that" or "in response to determining . . . " or "when the stated condition or event has been detected" or "in response to the stated condition or event having been detected".

The "configured to" or "configured for" as used herein is intended as opened and inclusive languages, and does not exclude apparatuses configured to perform or configured for performing additional tasks or steps.

In addition, the "based on" and "according to" as used is intended as opened and inclusive, because a process, step, calculation or other action "based on" one or more described conditions or values may, in practice, be based on an additional condition or exceed the described values. A process, step, calculation, or other action according to one or more described conditions or values may, in practice, accord to an additional condition or exceed the described values.

As used herein, "about", "substantially" or "approximately" includes the described value as well as an average value within an acceptable range of deviation from a particular value, the acceptable range of deviation is as determined by one of ordinary skill in the art taking into account the measurement in question and the error associated with the measurement of the particular quantity (i.e., limitations of the measurement system).

As used herein, "parallel", "perpendicular", "equal" and "flush" include the described situations as well as situations that are similar to the described situations and within an acceptable range of deviation. The acceptable range of deviation is determined by one of ordinary skill in the art taking into account the measurement in question as well as errors associated with the measurement of a particular quantity (i.e., the limitations of the measurement system). For example, "parallel" includes absolutely parallel and approximately parallel, where an acceptable range of deviation for approximately parallel may be, for example, within a deviation of 5°. "Perpendicular" includes absolutely perpendicular and approximately perpendicular, where an acceptable range of deviation for approximately perpendicular may also be, for example, within a deviation of 5°. "Equal" includes absolutely equal and approximately equal, where an acceptable range of deviation for approximately equal may be, for example, that the difference between the two that are equal is less than or equal to 5% of either. "Flush" includes absolutely flush and approximately flush, where an acceptable range of deviation for approximately flush may be, for example, that the distance between the two that are flush is less than or equal to 5% of the size of either.

It should be understood that when a layer or element is referred to as being on another layer or substrate, the layer or element may be directly on another layer or substrate, or there is an intermediate layer between the layer or element and another layer or substrate.

Exemplary embodiments are described herein with reference to sectional and/or planar views as idealized exemplary drawings. In the drawings, the thicknesses of the layers and regions are enlarged for clarity. Therefore, variations in shape relative to the drawings due to, for example, manufacturing techniques and/or tolerances can be envisaged. Thus, exemplary embodiments should not be construed as being limited to the shapes of the regions herein, but rather include shape deviations due to, for example, manufacturing. For example, etched regions shown as rectangular will typically have curved features. Accordingly, the regions shown in the drawings are essentially schematic and their shapes are not intended to illustrate the actual shapes of the regions of the device and are not intended to limit the scope of the exemplary embodiments.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A barometric pressure sensor, comprising a base substrate, and a first capacitor provided on a side of the base substrate, wherein the first capacitor comprises:

a first bottom electrode, provided close to the base substrate;

a first insulating layer, provided on a side of the first bottom electrode away from the base substrate; and a first top electrode, provided on a side of the first insulating layer away from the base substrate, wherein the first top electrode is provided with a first opening which is configured to expose the first insulating layer at a corresponding position; and wherein a dielectric constant of the first insulating layer varies under different humidity environments, so that a capacitance value of the first capacitor varies;

wherein the barometric pressure sensor further comprises a second capacitor provided on the same side of the base substrate as the first capacitor, and the second capacitor comprises: a second bottom electrode, provided close to the base substrate; a second cavity, provided on a side of the second bottom electrode away from the base substrate; and a second top electrode, provided on a side of the second cavity away from the base substrate; wherein the second cavity is a sealed cavity, and the second top electrode deforms under an action of external barometric pressure, so that a capacitance value of the second capacitor varies;

wherein the barometric pressure sensor further comprises:

a third cavity, provided on a side of the second top electrode away from the base substrate; and a third top electrode, provided on a side of the third cavity away from the base substrate;

wherein the second top electrode, the third cavity and the third top electrode constitute a third capacitor, and the third top electrode is provided with a second opening which is configured to communicate an external environment with the third cavity.

2. The barometric pressure sensor according to claim 1, wherein a surface of the first insulating layer away from the base substrate and a surface of the first top electrode close to the base substrate are in contact with each other.

3. The barometric pressure sensor according to claim 1, wherein the first capacitor further comprises:

a first cavity provided between the first insulating layer and the first top electrode, an orthographic projection of the first cavity on the base substrate at least partially overlaps with an orthographic projection of the first opening on the base substrate, and an area of the orthographic projection of the first cavity on the base substrate is greater than an area of the orthographic projection of the first opening on the base substrate.

4. The barometric pressure sensor according to claim 1, wherein the barometric pressure sensor further comprises:

a heating electrode insulated from the first bottom electrode and the first top electrode, respectively, an orthographic projection of the heating electrode on the base substrate does not overlap with an orthographic projection of the first bottom electrode on the base substrate and an orthographic projection of the first top electrode on the base substrate, and the orthographic projection of the heating electrode on the base substrate is within the orthographic projection of the first insulating layer on the base substrate.

5. The barometric pressure sensor according to claim 4, wherein the heating electrode is provided on the same layer and made of the same material as the first bottom electrode, and the heating electrode is a closed structure surrounding the first bottom electrode; and/or the heating electrode is provided on the same layer and made of the same material as the first top electrode, and the heating electrode is a closed structure surrounding the first top electrode.

6. The barometric pressure sensor according to claim 4, wherein in a first direction parallel to the base substrate, the barometric pressure sensor comprises a plurality of heating electrodes separated from each other, and the first direction is a direction from a center to an edge of the first insulating layer.

7. The barometric pressure sensor according to claim 1, wherein the first opening has at least one of the following features:

on a plane parallel to the base substrate, a plurality of first openings are evenly arranged on the first top electrode;

on the plane parallel to the base substrate, the plurality of first openings are arranged in an array along a row direction and/or a column direction;

a ratio of an area of an orthographic projection of the first opening on the base substrate to an area of an orthographic projection of the first top electrode on the base substrate is greater than or equal to 5% and less than or equal to 10%; and a shape of the orthographic projection of the first opening on the base substrate comprises at least one of a sector, an ellipse, a polygon and an irregular shape.

8. The barometric pressure sensor according to claim 1, wherein an orthographic projection of the first insulating layer on the base substrate covers an orthographic projection of the first bottom electrode on the base substrate and an orthographic projection of the first top electrode on the base substrate, respectively, and the orthographic projection of the first bottom electrode on the base substrate at least partially overlaps with the orthographic projection of the first top electrode on the base substrate.

9. The barometric pressure sensor according to claim 1, wherein the second opening has at least one of the following features:

on a plane parallel to the base substrate, a plurality of second openings are evenly arranged on the third top electrode;

on the plane parallel to the base substrate, the plurality of second openings are arranged in an array along a row direction and/or a column direction;

a ratio of an area of an orthographic projection of the second opening on the base substrate to an area of an orthographic projection of the third top electrode on the base substrate is greater than or equal to 5% and less than or equal to 10%; and a shape of the orthographic projection of the second opening on the base substrate comprises at least one of a sector, an ellipse, a polygon and an irregular shape.

10. The barometric pressure sensor according to claim 1, wherein an orthographic projection of the second bottom electrode on the base substrate and an orthographic projection of the second top electrode on the base substrate both cover an orthographic projection of the second cavity on the base substrate, and the orthographic projection of the second bottom electrode on the base substrate at least partially overlaps with the orthographic projection of the second top electrode on the base substrate.

11. The barometric pressure sensor according to claim 1, wherein an orthographic projection of the second top electrode on the base substrate covers an orthographic projection of the third cavity on the base substrate, the orthographic projection of the third cavity on the base substrate is within an outer contour of an orthographic projection of the third top electrode on the base substrate, and the orthographic projection of the second top electrode on the base substrate at least partially overlaps with the orthographic projection of the third top electrode on the base substrate.

12. The barometric pressure sensor according to claim 1, wherein the barometric pressure sensor further comprises at least one of:

a second insulating layer, provided between the first bottom electrode and the first insulating layer, wherein an orthographic projection of the second insulating layer on the base substrate at least covers an orthographic projection of the first bottom electrode on the base substrate; and a third insulating layer, provided on a side of the first top electrode away from the base substrate, wherein the third insulating layer is provided with a third opening, and an orthographic projection of the third opening on the base substrate at least partially overlaps with an orthographic projection of the first opening on the base substrate.

13. An electronic device comprising:

the barometric pressure sensor according to claim 1; and a detection circuit, connected to the barometric pressure sensor, for determining an environment humidity around the barometric pressure sensor based on the capacitance value of the first capacitor.

14. A method for preparing a barometric pressure sensor according to claim 1, comprising:

providing a base substrate;

forming the first bottom electrode, the first insulating layer and the first top electrode sequentially on the side of the base substrate, wherein the first bottom electrode, the first insulating layer and the first top electrode constitute the first capacitor;

forming, on the same side of the base substrate as the first capacitor, the second bottom electrode, the second cavity and the second top electrode, wherein the second bottom electrode, the second cavity and the second top electrode constitute the second capacitor;

forming the third cavity on the side of the second top electrode away from the base substrate, forming the third top electrode on the side of the third cavity away from the base substrate; wherein the second top electrode, the third cavity and the third top electrode constitute the third capacitor.

15. The method according to claim 14, wherein the forming the first bottom electrode, the first insulating layer and the first top electrode sequentially on the side of the base substrate, comprises:

forming the first bottom electrode on the side of the base substrate;

forming a first insulating layer pattern on a side of the first bottom electrode away from the base substrate by a first patterning process;

performing plasma bombardment on the first insulating layer pattern to form nanofibers in the first insulating layer pattern, and obtaining the first insulating layer; and forming the first top electrode on a side of the first insulating layer away from the base substrate.

16. The method according to claim 14, wherein the forming the first bottom electrode, the first insulating layer and the first top electrode sequentially on the side of the base substrate, comprises:

forming the first bottom electrode on the side of the base substrate;

forming a first insulating layer pattern on a side of the first bottom electrode away from the base substrate by a first patterning process;

performing plasma bombardment on the first insulating layer pattern to form nanofibers in the first insulating layer pattern, and obtaining the first insulating layer; and forming a first sacrificial layer material on the side of the first insulating layer away from the base substrate, wherein an orthographic projection of the first sacrificial layer material on the base substrate at least covers an orthographic projection of the first insulating layer on the base substrate; and forming the first top electrode on a side of the first sacrificial layer material away from the base substrate by a second patterning process;

forming a first cavity and a first sacrificial layer between the first insulating layer and the first top electrode by etching the first sacrificial layer material through a first opening in the first top electrode, wherein an orthographic projection of the first cavity on the base substrate at least partially overlaps with an orthographic projection of the first opening on the base substrate, and an area of the orthographic projection of the first cavity on the base substrate is greater than an area of the orthographic projection of the first opening on the base substrate.

17. A barometric pressure sensor, comprising a base substrate, and a first capacitor provided on a side of the base substrate, wherein the first capacitor comprises:

a first bottom electrode, provided close to the base substrate;

a first insulating layer, provided on a side of the first bottom electrode away from the base substrate; and a first top electrode, provided on a side of the first insulating layer away from the base substrate, wherein the first top electrode is provided with a first opening which is configured to expose the first insulating layer at a corresponding position; and wherein a dielectric constant of the first insulating layer varies under different humidity environments, so that a capacitance value of the first capacitor varies;

wherein the barometric pressure sensor further comprises a second capacitor provided on the same side of the base substrate as the first capacitor, and the second capacitor comprises: a second bottom electrode, provided close to the base substrate; a second cavity, provided on a side of the second bottom electrode away from the base substrate; and a second top electrode, provided on a side of the second cavity away from the base substrate; wherein the second cavity is a sealed cavity, and the second top electrode deforms under an action of external barometric pressure, so that a capacitance value of the second capacitor varies;

wherein the first bottom electrode is provided on the same layer as the second top electrode.

18. A barometric pressure sensor, comprising a base substrate, and a first capacitor provided on a side of the base substrate, wherein the first capacitor comprises:

a first bottom electrode, provided close to the base substrate;

a first insulating layer, provided on a side of the first bottom electrode away from the base substrate; and a first top electrode, provided on a side of the first insulating layer away from the base substrate, wherein the first top electrode is provided with a first opening which is configured to expose the first insulating layer at a corresponding position; and wherein a dielectric constant of the first insulating layer varies under different humidity environments, so that a capacitance value of the first capacitor varies;

wherein the barometric pressure sensor further comprises a second capacitor provided on the same side of the base substrate as the first capacitor, and the second capacitor comprises: a second bottom electrode, provided close to the base substrate; a second cavity, provided on a side of the second bottom electrode away from the base substrate; and a second top electrode, provided on a side of the second cavity away from the base substrate; wherein the second cavity is a sealed cavity, and the second top electrode deforms under an action of external barometric pressure, so that a capacitance value of the second capacitor varies;

wherein the second capacitor is provided between the first capacitor and the base substrate, and an orthographic projection of the first capacitor on the base substrate at least partially overlaps with an orthographic projection of the second capacitor on the base substrate.

* * * * *